United States Patent
Wyle

(10) Patent No.: US 7,853,494 B2
(45) Date of Patent: Dec. 14, 2010

(54) EFFICIENT WORK FLOW SYSTEM AND METHOD FOR PREPARING TAX RETURNS

(75) Inventor: David A. Wyle, Newport Coast, CA (US)

(73) Assignee: SurePrep, LLC, Newport Beach, CA (US)

( * ) Notice: Subject to any disclaimer, the term of this patent is extended or adjusted under 35 U.S.C. 154(b) by 1133 days.

(21) Appl. No.: 11/031,060

(22) Filed: Jan. 7, 2005

(65) Prior Publication Data

US 2006/0155618 A1    Jul. 13, 2006

(51) Int. Cl.
G06F 17/22 (2006.01)
G06Q 20/00 (2006.01)
G06Q 40/00 (2006.01)

(52) U.S. Cl. .................. 705/31; 705/19; 705/36 T
(58) Field of Classification Search .............. 705/31
See application file for complete search history.

(56) References Cited

U.S. PATENT DOCUMENTS

| | | | |
|---|---|---|---|
| 3,963,910 A | 6/1976 | Enomoto et al. | |
| 4,754,326 A | 6/1988 | Kram et al. | |
| 5,054,096 A * | 10/1991 | Beizer ................ | 382/305 |
| 5,144,115 A | 9/1992 | Yoshida | |
| 5,404,294 A | 4/1995 | Karnik | |
| 5,737,599 A | 4/1998 | Rowe et al. | |
| 5,787,295 A | 7/1998 | Nakao | |
| 5,848,426 A | 12/1998 | Wang et al. | |
| 5,878,215 A | 3/1999 | Kling et al. | |
| 5,923,842 A | 7/1999 | Pedersen et al. | |
| 5,940,811 A | 8/1999 | Norris | |
| 5,963,926 A | 10/1999 | Kumomura | |
| 6,003,019 A | 12/1999 | Eaton et al. | |
| 6,009,442 A | 12/1999 | Chen et al. | |
| 6,012,050 A | 1/2000 | Eaton et al. | |
| 6,021,400 A | 2/2000 | Gallacher et al. | |
| 6,128,633 A | 10/2000 | Michelman et al. | |
| 6,144,380 A | 11/2000 | Shwarts et al. | |
| 6,173,285 B1 | 1/2001 | Nishita et al. | |
| 6,202,052 B1 | 3/2001 | Miller | |
| 6,209,095 B1 | 3/2001 | Anderson et al. | |
| 6,226,752 B1 | 5/2001 | Gupta et al. | |

(Continued)

OTHER PUBLICATIONS

Ted Needleman, Accounting Today, New York, Aug. 1998, vol. 12, Iss. 14, p. 24, 4 pgs.*

(Continued)

*Primary Examiner*—F. Ryan Zeender
*Assistant Examiner*—Fahd A Obeid
(74) *Attorney, Agent, or Firm*—Snell & Wilmer L.L.P.

(57) ABSTRACT

A processor-based method for preparing a tax return using multiple service providers. The method includes receiving at a first service provider an image file that includes a plurality of data values and assigning at the first service provider the image file to a form having a plurality of predefined field names, wherein each of the plurality data values belong to one of the plurality of predefined field names. The method also includes receiving at a second service provider the image file and an input form having a plurality of input fields corresponding to the plurality of predefined field names and associating at the second service provider the plurality of data values from the image file with the plurality of input fields.

11 Claims, 8 Drawing Sheets

U.S. PATENT DOCUMENTS

| | | | |
|---|---|---|---|
| 6,237,011 B1 | 5/2001 | Ferguson et al. |
| 6,272,484 B1 | 8/2001 | Martin et al. |
| 6,298,357 B1 | 10/2001 | Wexler et al. |
| 6,311,165 B1 | 10/2001 | Coutts et al. |
| 6,338,138 B1 | 1/2002 | Raduchel et al. |
| 6,369,811 B1 | 4/2002 | Graham et al. |
| 6,473,741 B1 | 10/2002 | Baker |
| 6,476,930 B1 | 11/2002 | Roberts et al. |
| 6,480,866 B2 | 11/2002 | Mastie |
| 6,510,466 B1 | 1/2003 | Cox et al. |
| 6,539,479 B1 | 3/2003 | Wu |
| 6,567,628 B1 | 5/2003 | Guillemin et al. |
| 6,567,789 B1 | 5/2003 | Baker |
| 6,572,661 B1 | 6/2003 | Stern |
| 6,584,505 B1 | 6/2003 | Howard et al. |
| 6,598,023 B1 | 7/2003 | Drummond et al. |
| 6,601,173 B1 | 7/2003 | Mohler |
| 6,658,464 B2 | 12/2003 | Reisman |
| 6,721,783 B1 | 4/2004 | Blossman et al. |
| 6,912,508 B1 | 6/2005 | McCalden et al. |
| 6,957,384 B2 | 10/2005 | Jeffery et al. |
| 7,155,404 B1 | 12/2006 | Johnson et al. |
| 7,171,615 B2 | 1/2007 | Jensen |
| 7,234,103 B1 | 6/2007 | Regan |
| 7,257,553 B1 | 8/2007 | Baker |
| 7,584,884 B2 | 9/2009 | Fox et al. |
| 7,647,258 B2 | 1/2010 | William et al. |
| 7,660,988 B2 | 2/2010 | Carmichael et al. |
| 2001/0037268 A1 | 11/2001 | Miller |
| 2001/0044762 A1 | 11/2001 | Nault |
| 2002/0133410 A1 | 9/2002 | Hermreck et al. |
| 2002/0161698 A1 | 10/2002 | Wical |
| 2002/0161796 A1 | 10/2002 | Sylthe |
| 2002/0184125 A1 | 12/2002 | Cirulli et al. |
| 2003/0036912 A1 * | 2/2003 | Sobotta et al. ................. 705/1 |
| 2003/0061131 A1 | 3/2003 | Parkan, Jr. |
| 2003/0163547 A1 | 8/2003 | Beisty et al. |
| 2003/0233296 A1 * | 12/2003 | Wagner ....................... 705/31 |
| 2004/0024665 A1 | 2/2004 | Foster |
| 2004/0078271 A1 | 4/2004 | Morano et al. |
| 2004/0088233 A1 | 5/2004 | Brady et al. |
| 2004/0150854 A1 | 8/2004 | Sprague et al. |
| 2004/0216057 A1 | 10/2004 | Wyle et al. |
| 2004/0225581 A1 | 11/2004 | Wyle et al. |
| 2004/0243626 A1 | 12/2004 | Wyle et al. |
| 2005/0038722 A1 | 2/2005 | Throndson et al. |
| 2005/0060234 A1 | 3/2005 | Reahard |
| 2005/0065852 A1 | 3/2005 | Bross et al. |
| 2005/0102283 A1 | 5/2005 | Anderson et al. |
| 2006/0026083 A1 | 2/2006 | Wyle |
| 2006/0026086 A1 | 2/2006 | Jim |
| 2006/0178961 A1 | 8/2006 | Stanley et al. |
| 2006/0180650 A1 | 8/2006 | Claessens et al. |
| 2007/0033118 A1 | 2/2007 | Hopkinson |
| 2007/0250392 A1 | 10/2007 | Paulsen et al. |
| 2008/0077503 A1 | 3/2008 | Zias et al. |
| 2008/0082432 A1 | 4/2008 | Baker |
| 2008/0120129 A1 | 5/2008 | Seubert et al. |
| 2008/0147494 A1 | 6/2008 | Larson |
| 2008/0319882 A1 | 12/2008 | Wyle |

OTHER PUBLICATIONS

IntelliTax for Windows and DOS, Accounting Technology, v 18, n 9, p. 38, Oct. 2002.

SurePrep introduces Tax prep Workflow System, Anonymous, CPA technology Advisor, Ft. Atkinson, Jun./Jul. 2005, vol. 15, Issue 3, 1 page.

Missing Links: an insider's view, Dauphinais G. Williams, PC Magazine, vol. 6, No. 15, 24 pages.

* cited by examiner

FIG. 7

[Screenshot of SurePrep - PreProcessor DashBoard showing a W-2 form (Form W-2: ABC INC) being displayed in Microsoft Internet Explorer]

Engagement: 123456/Client: ABC123 Form: Income - Wages - W2 - ABC INC

Page: 21 of 70

| a Control number | 22222 | Void | For Official Use Only OMB No. 1545-0008 | |
|---|---|---|---|---|
| b Employer identification number 354-6894302 T/R | | | 1 Wages, tips, other compensation 80,000 | FORM W-2: ABC INC |
| c Employer's name, address, and Zip code ABC INC | | | 2 Social security wages 80,000 | Box 1: Wages, tips, other compensation |
| | | | 6 Medicare wages and tips 80,000 | Box 2: Federal income tax withheld |
| | | | 7 Social security tips | Box 4: Social security tax withheld |
| | | | | Box 5: Medicare tax withheld |
| d Employee's social security number 999-99-9991 | | | 9 Advance EIC payment | Box 10: Dependent care benefits |
| e Employee's first name and initial TOM | Last name REYNOLDS | | 11 Nonqualified plans | Box 17: State Income tax |
| | | | 13 Statutory Retirement Third-party employee plan sick pay | Box 19: Local Income tax |
| 14205 ALPINE ROAD | | | 14 Other | 10 Dependent care benefits |
| BIG BEAR CITY | | | | 12a See instructions for box 12 |
| CA 90888 | | | | 12b |
| f Employee's address and ZIP code | | | | 12c |
| | | | | 12d |
| 15 State T/R Employer's state ID number CA | 16 State wages, tips, etc 80,000 | T/R State Income tax 4,000 | 18 Local wages, tips, etc | 19 Local income tax | 20 Locality name |

SurePrep - PreProcessor DashBoard - Microsoft Internet Explorer

File Edit View Favorites Tools Help  FAX

Back  ☒ ⟲  Search ☆ Favorites ⬡ ⬢ ⬣ ⬤ ⬥ ⬦  → Go

Address: C:\Documents and Settings\dwyle\My Documents\SurePrep\Product Design\2005 Product Ideas\Data Entry Operator Prototypes\v1\dataentryoperator\main.htm Engagement: 123456/Client: ABC123 Form: Income - Wages - W-2 - Fly By Night Inc Page: 21 of 70 ▶ ▶|    100 ⊕

| a Control number | void | For Official Use Only OMB No. 1545-0008 | | |
|---|---|---|---|---|
| 22222 | | | | |

| Employer identification number | | 1 Wages, tips, other compensation | 2 Federal income tax withheld |
|---|---|---|---|
| 54-6894302 T/R | | 800    80,000 | 815 ▨ 12,000 |

Employer's name, address, and Zip code
ABC INC

| | 3 Social security wages | 4 Social security tax withheld |
|---|---|---|
| | T/R    80,000 | T/R    4,960 |
| | 5 Medicare wages and tips | 6 Medicare tax withheld |
| | T/R    80,000 | T/R    1,162 |

Employee's social security number
99-99-9991

| 7 Social security tips | 8 Allocated tips |
|---|---|
| 9 Advance EIC payment | 10 Dependent care benefits |
| 11 Nonqualified plans | 12a See instructions for box 12 |
| 13 Statutory employee / Retirement plan / Third-party sick pay | 12b |

Employee's first name and initial | Last name
TOM | REYNOLDS

FORM W-2: ABC123

| Item Name | Description | Amount |
|---|---|---|
| Box 1: Wages, tips, other compensation | | 80000 |
| Box 2: Federal Income tax withheld | | 12000 |
| Box 4: Social security tax withheld | | 4960 |
| Box 5: Medicare tax withheld | | 1162 |
| Box 17: State Income tax | | |

⎫
⎬ 810
⎭

805 start | ... | Inbox - Microso... | document - Mi... | C:\Documents... | SurePrep - Pre... | 11:57 AM

FIG. 9

EFFICIENT WORK FLOW SYSTEM AND METHOD FOR PREPARING TAX RETURNS

FIELD OF THE DISCLOSURE

The invention relates generally to preparing tax returns, and more particularly to an efficient work flow system and method for preparing tax returns.

BACKGROUND

Source documents (e.g., W-2s, Settlement Statements, 1099s, K-1s, etc.) are received from many different sources such as employers, partnerships, investment firms, charities, and so on, and are used to prepare tax returns. Source documents may also be referred to as tax documents. These source documents may be submitted to a person who prepares tax returns for individuals and businesses. The person who prepares these tax returns, generally referred to as a tax preparer, has a high level of skill due to the intricacies and nuances of the internal revenue service's (IRS's) tax code and the knowledge required to accurately prepare tax returns. Even using a tax software product, the tax preparer must have specialized training and expertise to navigate though the tax software product and to interpret information contained on the source documents. Therefore, each tax return generally requires a different level of skill to accurately complete. For example, a tax return with only W-2 and 1099 source documents requires the tax preparer to have less skill than a tax return with W-2, settlement statement, and schedule C business income source documents. Accordingly, due to the variations in skill required to prepare a tax return, the tax preparer must have a wide range of knowledge and experience with tax return preparation.

FIG. 1 is a simplified block diagram of a prior art method of preparing a tax return using only one tax preparer. Each tax return (e.g., TR 1, TR 2, etc.) is prepared by one tax preparer who sequentially reviews each source document, and then prepares the tax return using data obtained from each source document. For example, the tax preparer reviews the W-2, settlement statement, and 1099 source documents for the first tax return and then enters data obtained from the source documents into the first tax return to prepare the first tax return. Thereafter, the tax preparer reviews the W-2, settlement statement, and 1099 source documents for the second tax return and then enters data obtained from the source documents into the second tax return to prepare the second tax return and so on. Hence, each tax return is prepared in series using only one tax preparer at a time.

For several reasons, the preparation of a tax return was accomplished when one person at a time (as opposed to multiple people simultaneously) prepared the entire tax return. First, the source documents are traditionally in paper format and only reside with one tax preparer at a time. The tax preparer can make copies and distribute them to multiple tax preparers, however, this increases the time spent preparing each tax return. For example, additional time is spent photocopying and distributing the source documents, tracking who is working with the source documents, and merging work performed by each person into the tax return.

Second, because the hard copy nature of the source documents promoted single person preparation, currently available tax software products (e.g., Turbo Tax, Tax Cut, ProSystem fx Tax, GoSystem Tax, Lacerte, UltraTax, ProSeries, etc.) only support one person entering data into a tax return at a time. For example, conventional tax software products require the tax preparer to select and open a single tax return. Then, the tax preparer gathers all the source documents, reviews the source documents, and inputs information from the source documents into the tax return. The tax preparer moves from one source document to the next until all the information for a specific tax return has been entered. Then, the tax preparer can move to the next tax return. Therefore, it is technically impossible to have multiple people simultaneously enter data into a single tax return because currently available tax software products only support one person entering data into a tax return at a time.

Another drawback of conventional tax preparation systems and methods is that the tax preparer must have a high level of expertise to prepare the more complicated portions of the tax return. However, these expertise are wasted on the less complicated portions of the tax return. Accordingly, the tax preparer's knowledge and skills are not fully utilized during preparation of an entire tax return.

Accordingly, it should be appreciated that there is a need for an efficient work flow system and method for preparing tax returns by multiple people who have varying skill levels. The invention fulfills this need as well as others.

SUMMARY OF THE INVENTION

The invention allows the source documents to be scanned in to produce one or more image files or electronic source documents, which can be simultaneously sent to multiple service providers. The service providers may be a computer system (e.g., a software process or routine), a person (e.g., a data entry operator, a tax preparer, and a referencer) and/or any other person or system involved in the preparation of the tax returns. In one embodiment, each electronic source document includes tax documents pertaining to a single tax return for a business or a single person or group of people. The invention allows for the distribution of the electronic source document and related input forms to one or more service providers, the management of the work flow amongst multiple service providers, the monitoring of the work loads of the service providers, the preparation of the tax return by multiple service providers, and the completion of the tax returns. The service providers may simultaneously prepare portions of one or more tax returns.

Some advantages of the invention may include increasing the total number of tax returns prepared in a given time period by having the tax preparer only spend time on the more complicated portions of the tax return and by having a service provider, with less skill than the tax preparer, simultaneously access the less complicated portions of the tax return. Hence, while the tax preparer is working on the more complicated portions of the tax return, the lower skilled, lower paid service provider may be working on the less complicated portions of the tax return. Therefore, the tax preparer's knowledge and skills are fully utilized during preparation of each tax return.

The increased productivity and reduced preparation costs are particularly important during tax season when accounting firms have an increased work load. During tax season, accounting firms can hire or utilize lower skilled, lower paid service providers who can more efficiently and effectively assist in the preparation of tax returns because they do not need the high level of skill required to prepare a tax return but rather only need the skills or training to enter data into specified data entry fields. For example, an accounting firm can hire seasonal data entry operators instead of additional tax preparers who are difficult to find and hire during tax season. These seasonal data entry operators are easier to find and more economical to use than highly qualified, trained, and experienced tax preparers.

One embodiment of the invention includes a processor-based method for preparing a tax return using multiple service providers. The method includes receiving at a first service provider an image file that includes a plurality of data values (e.g., numbers, text, dates, amounts, or other defining data elements) and assigning at the first service provider the image file to a form having a plurality of predefined field names, wherein each of the plurality of data values belong to one of the plurality of predefined field names. The method also includes receiving at a second service provider the image file and an input form having a plurality of input fields corresponding to the plurality of predefined field names and associating at the second service provider the plurality of data values from the image file with the plurality of input fields.

One embodiment of the invention includes a processor-based method for preparing a tax return using a plurality of service providers. The method may include receiving an electronic source document or image file having a plurality of data values, associating the electronic source document with an input form containing a number of input fields related to the plurality of data values on the electronic source document, and placing, using a first service provider, a reference adjacent to each of the plurality of data values. The method may also include extracting, using a second service provider, the plurality of data values that are adjacent to the references, creating a tax return using the plurality of data values, and creating a set of fully-cross referenced work papers.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein:

FIG. 7 is a page of the electronic source document, as seen by a referencer, illustrating a W-2 source document from ABC INC according to an embodiment of the invention;

FIG. 8 is a page of the electronic source document, as seen by a tax preparer or a data entry operator, illustrating a W-2 source document from ABC INC according to an embodiment of the invention; and FIG. 9 is a page of the electronic source document, as seen by a tax preparer, illustrating a W-2 source document from ABC INC according to an embodiment of the invention.

DETAILED DESCRIPTION

Reference will now be made to the preferred embodiments of the invention, examples of which are illustrated in the accompanying drawings. While the invention will be described in conjunction with the preferred embodiments, it will be understood that these embodiments are not intended to limit the scope of the invention. On the contrary, the invention is intended to cover alternatives, modifications and equivalents, which may be included within the spirit and scope of the invention as defined by the appended claims. In the following detailed description, numerous specific details are set forth in order to provide a thorough understanding of the invention. However, it will be understood by one skilled in the art that the invention may be practiced without these specific details. In other instances, well known systems, components, methods and procedures have not been described in detail so as not to unnecessarily obscure the important features of the invention. As will be appreciated, various embodiments of the invention are described herein and shown in the figures. The term link and reference may be used interchangeably in certain instances in this disclosure.

Figure 1:
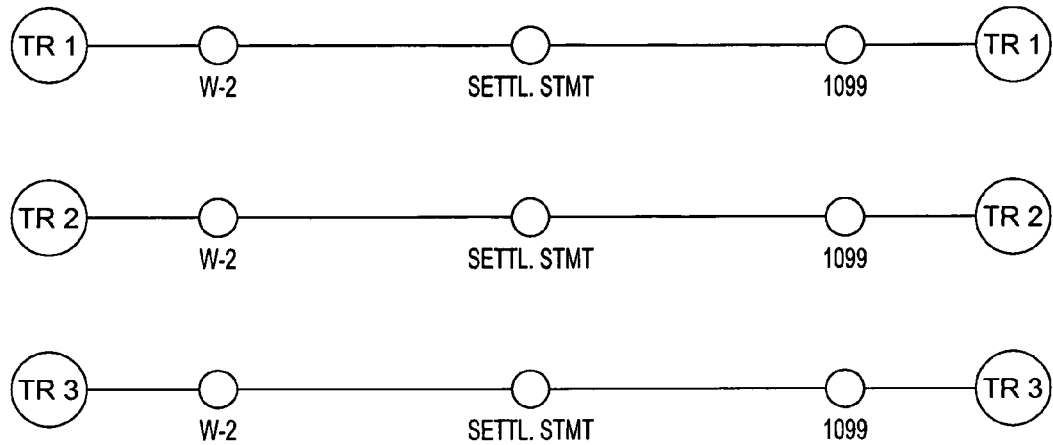
FIG. 1 is a simplified block diagram of a prior art method of preparing a tax return using only one tax preparer.
Figure 2:
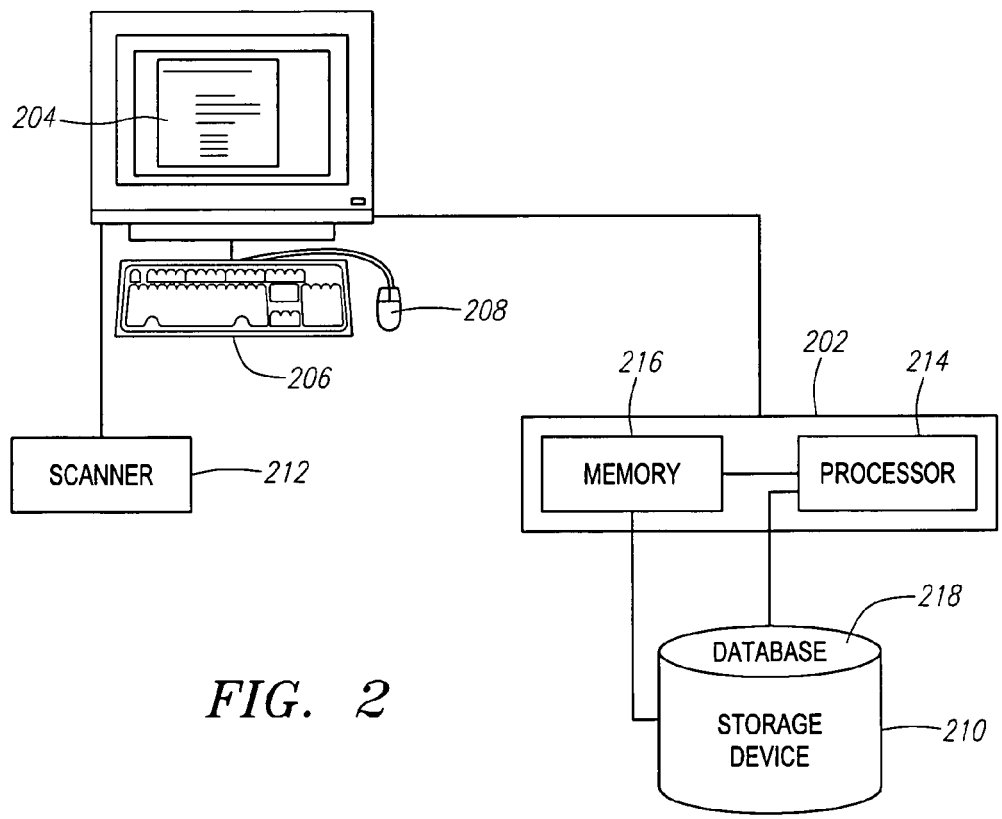
FIG. 2 is a simplified block diagram of a computer system having a software program for preparing tax returns using multiple service providers according to an embodiment of the invention.

FIG. 2 is a simplified block diagram of a computer system 200 having a software program for preparing income tax returns using multiple service providers. The computer system 200 (e.g., a personal computer, hand-held device or workstation) may include a digital computer 202, a display screen 204, a keyboard 206, a mouse 208 or other pointing device, a storage device 210 (e.g., a hard disk drive, optical disk drive, magnetic disk drive or floppy disk drive), and a scanner 212. The digital computer 202 may include a processor 214, a memory 216 (e.g., RAM, ROM or cache), and other customary components (e.g., memory bus and peripheral bus). The software program is generally stored in the storage device 210 or in the memory 216 and is executed by the processor 214. In one embodiment, the electronic source documents and the tax returns are stored in the storage device 210 or in the memory 216. The software program can also be implemented using hardware, software or a combination of hardware and software. The storage device 210 can be referred to as a machine-readable medium, which may be any mechanism that provides (i.e., stores and/or transmits) information in a form readable by the digital computer 202 (e.g., the processor 214). For example, the machine-readable medium may be a read only memory (ROM), a random access memory (RAM), a cache, a hard disk drive, a floppy disk drive, a magnetic disk storage media, an optical storage media, a flash memory device or any other device capable of storing information. The storage device 210 may include a database 218 that can be used to store, arrange and retrieve data from the storage device 210.

Figure 3:
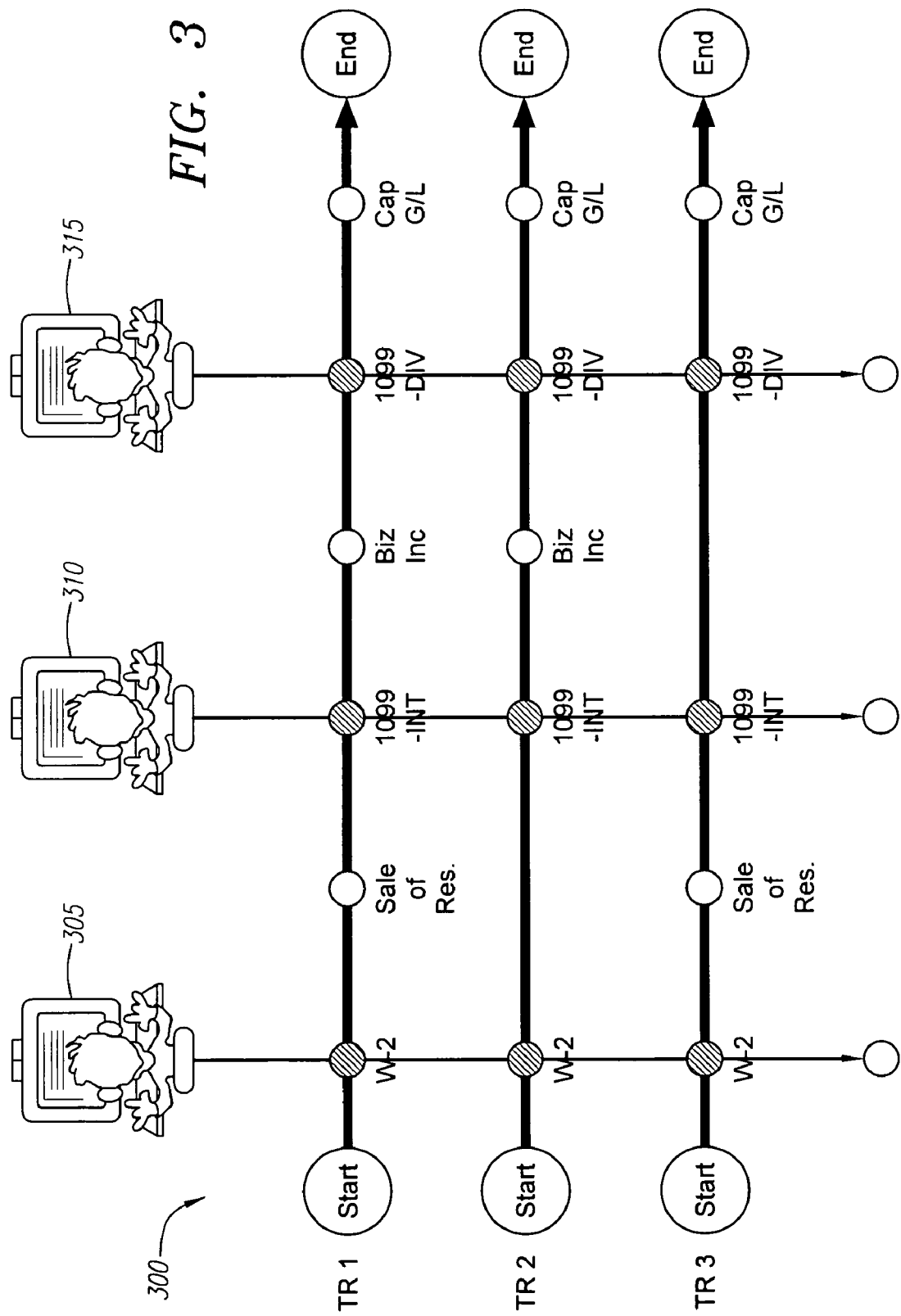
FIG. 3 is a simplified block diagram of a method of preparing tax returns using multiple service providers according to an embodiment of the invention.

FIG. 3 is a simplified block diagram 300 of a method of preparing tax returns (e.g., TR 1, TR 2, etc.) using multiple service providers 305, 310, and 315. When preparing a tax return, some tasks performed by a service provider are relatively easy and some tasks are relatively difficult. That is, the degree of skill needed to prepare one portion of a tax return varies from another portion of a tax return. For example, a tax return with only W-2 and 1099 source documents requires the service provider to have less skill than a tax return with W-2, sale of residence, schedule C business income, capital gains/losses, and 1099 source documents. Therefore, to have one very skilled tax preparer (e.g., a certified public accountant (CPA), enrolled agent (EA), or other trained tax professional) prepare an entire tax return is inefficient because some of the tasks can be performed by lower paid, lower skilled service providers, such as data entry operators, thus freeing up the tax preparer's time for performing more complex tasks. Also, having multiple people with varying skill levels prepare specific portions of a tax return can be more efficient for the tax preparer and more cost effective for the tax payer.

As shown in FIG. 3, each tax return includes various source documents. As an example, the source documents for TR 1 include a W-2, sale of residence, 1099-INT, business income, 1099-DIV, and capital gains/losses document. Generally, the tax preparer works on one tax return at a time but allows one or more service providers to work on a subset of the source documents (such as all W-2 and 1099 source documents) related to the tax return the tax preparer is working on or to another tax return. For example, to efficiently complete TR 1, the tax preparer can work on the sale of residence, business income, and capital gains/losses documents while allowing a first service provider 305 to access and input information related to the W-2 source document, a second service provider 310 to access and input information related to 1099-INT source document, and a third service provider 315 to access and input information related to 1099-DIV source document.

Once the first service provider 305 has completed the W-2, he can work on another W-2 for the same tax return if one exists or work on another W-2 for a different tax return. Even though the tax preparer is working on one of the source documents for TR 1, service provider 305 may be working on a W-2 for TR 2, service provider 310 may be working on a 1099-INT for TR 1, and service provider 315 may be working on a 1099-DIV for TR 3. Hence, one or more service providers generally work on one tax document at a time, and then move to the next tax document irrespective of whether it is from the same tax return or not. The tax preparer generally works on one tax return at a time before moving on to the next tax return. This allows one or more service providers to specialize on one or more tax document types and thus complete the tax return in a shorter amount of time. The extent of specialization for each service provider (i.e., whether a data entry operator just works on a single source document type such as W-2s or works on multiple document types such as W-2s and 1099s) is configurable depending on the size of the tax preparation operation. For example, larger tax preparation operations tend to have greater specialization because they have more data entry operators and more volume.

Information related to these source documents can be input by a lower skilled data entry operator, thus freeing up more time for the more skilled tax preparer to input information related to the sale of residence, business income, and capital gains/losses source documents. In this example, each service provider is responsible for learning and inputting information related to a different source document. Therefore, each service provider needs to have a limited number of skills to complete its tasks for particular source documents. Once the information is input by the lower skilled data entry operators, the tax preparer is notified that the information has been input for TR 1. Each service provider can operate at its own speed in completing its assigned tasks, thus allowing multiple service providers to simultaneously work on the same tax return. The tax preparer determines which source documents should be accessible by the lower skilled service providers.

Figure 4:
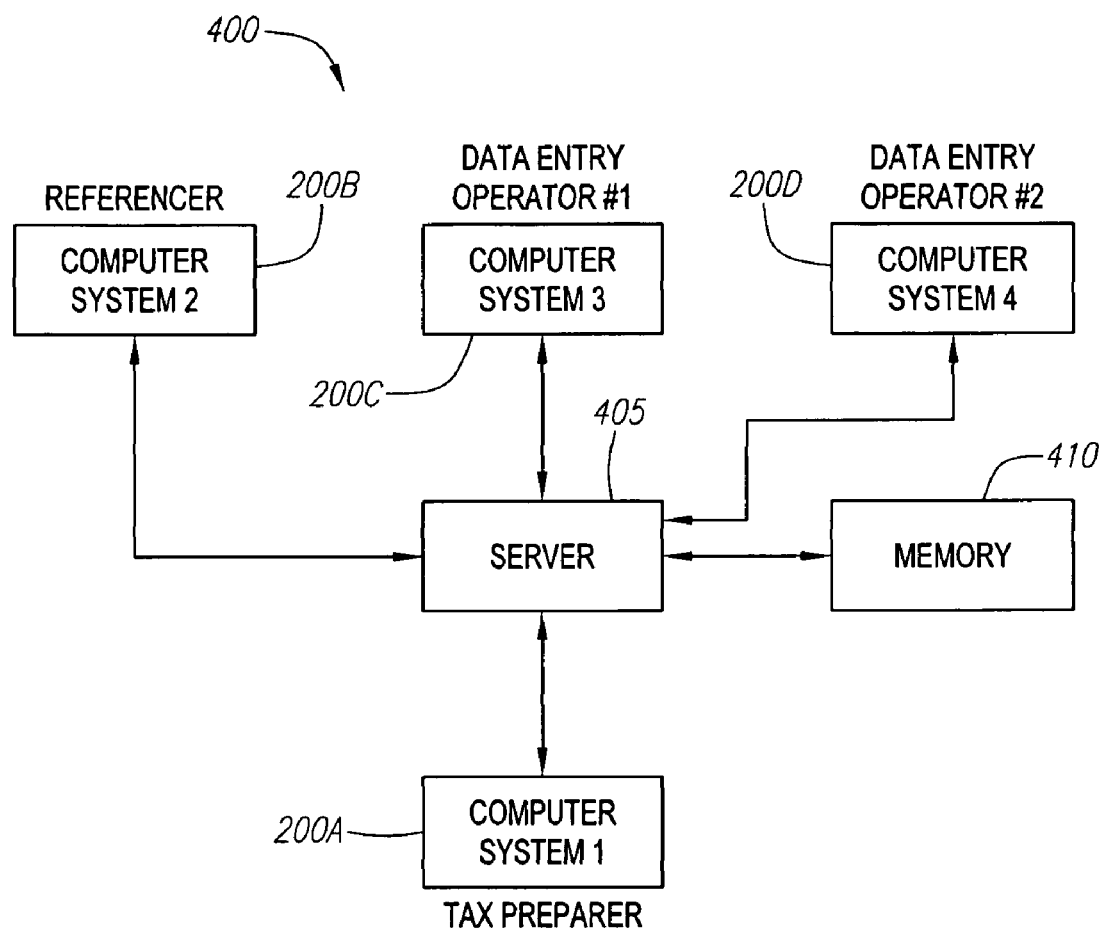
FIG. 4 is a simplified block diagram of a computer network including a plurality of computer systems used by a plurality of service providers for preparing tax returns according to an embodiment of the invention.

FIG. 4 is a simplified block diagram of a computer network 400 including a plurality of computer systems 200A-200D used by a plurality of service providers (i.e., referencer, data entry operator #1, and data entry operator #2) for preparing portions of tax returns. The computer network 400 also includes a server 405 having a memory 410 used to store the electronic source documents, the tax returns, and other documents related to the tax returns. The plurality of computer systems 200A-200D are coupled via a network (e.g., the Internet) to the server 405.

The computer system 200A generally controls the work flow amongst the other computer systems 200B-200D. For example, a tax preparer using computer system 200A can allow one or more service providers using one or more computer systems 200B-D the ability to retrieve, input, edit, and save information to and from the memory 410. Similarly, the tax preparer using computer system 200A can retrieve, input, edit, and save information to and from the memory 410.

Figure 5:
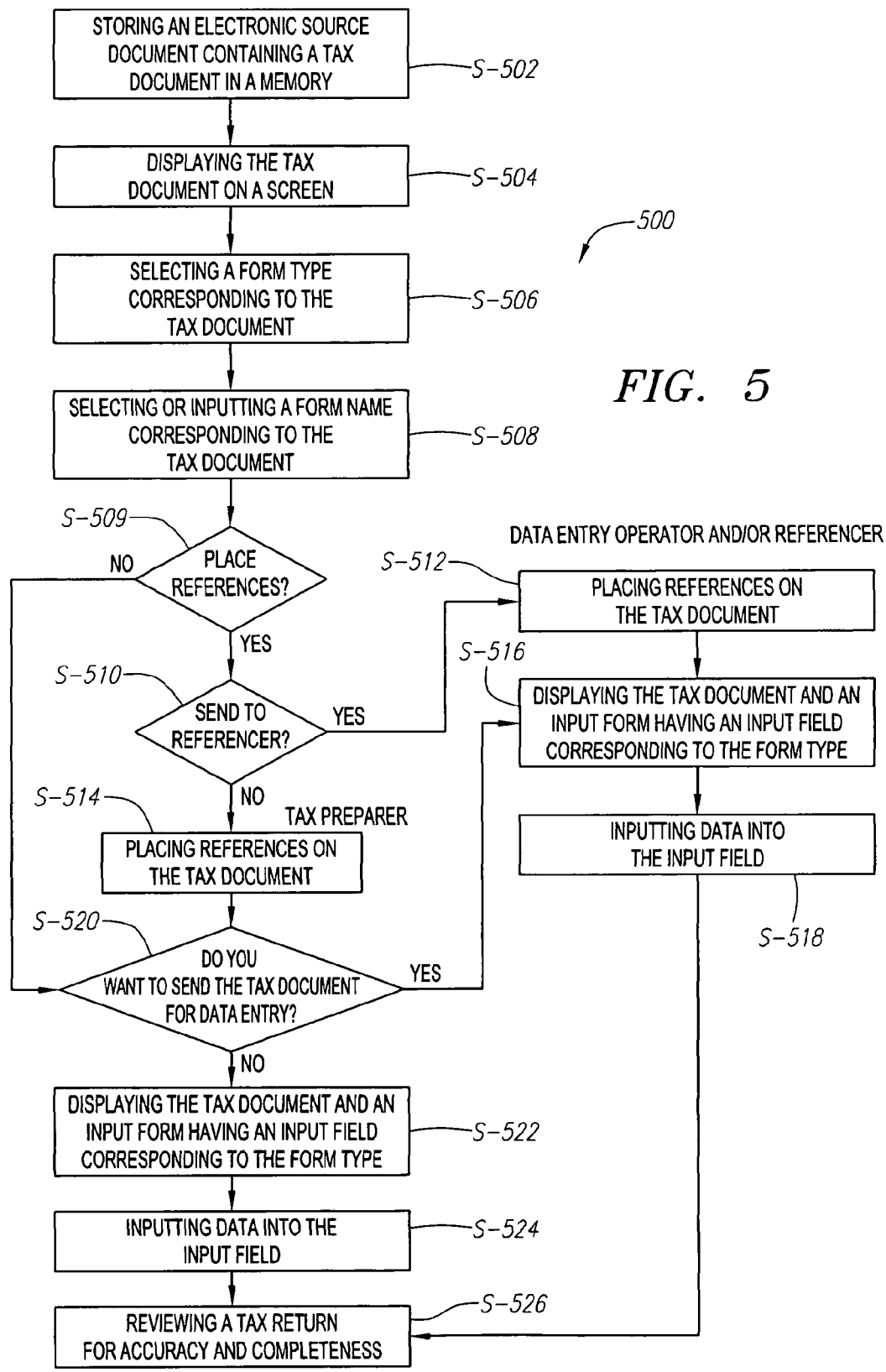
FIG. 5 is a simplified flow diagram illustrating a method for preparing tax returns using multiple service providers according to an embodiment of the invention.

FIG. 5 is a simplified flow diagram 500 illustrating a method for preparing tax returns using multiple service providers. The method allows a person or computer system to divide the preparation of a tax return into units of work based on the level of skill needed to perform the unit of work. Each unit of work can be performed by a highly skilled worker or assigned to a service provider with a skill level commensurate with the level of skill needed to perform the unit of work. Hence, the method allows the highly skilled worker to manage and assign a particular unit of work to a particular service provider or group of service providers. The method reduces the amount of time a highly skilled worker is working on easy tasks and increases the amount of time the highly skilled worker is working on difficult tasks. The method matches the skill level of the unit of work to the skill level of the service provider and allows multiple service providers to simultaneously work on the preparation of a tax return.

Source documents are generally in the form of paper documents that are received by a tax payer shortly after the end of each calendar year. Upon receipt by the tax payer, the source documents are forwarded to a tax preparer for review and preparation of a tax return. To allow the tax preparer the ability to electronically access, manage and work on the source documents using the computer system 100A, the source documents can be scanned in to produce an image file or an electronic source document, such as a portable document format (PDF) document or file, using the scanner 212. Generally, each electronic source document includes tax documents pertaining to a single tax return. Once scanned in, the electronic source document can be stored in the memory 410 (S-502) and pages of the electronic source document can be simultaneously accessed and viewed by multiple service providers from multiple locations to facilitate the efficient preparation of a tax return.

The electronic source document allows multiple service providers to work on the tax return from anywhere at anytime. The electronic source document is typically arranged as a sequence of individual pages where each page can have objects, such as text, graphics, images, color spaces, annotations, and so on. A document viewing software program, such as Adobe Acrobat from Adobe Systems Incorporated of San Jose, Calif., can be used to view the pages of the electronic source document. In one embodiment, the tax preparer causes the computer system 200A to display one or more pages of the electronic source document.

Figure 6:
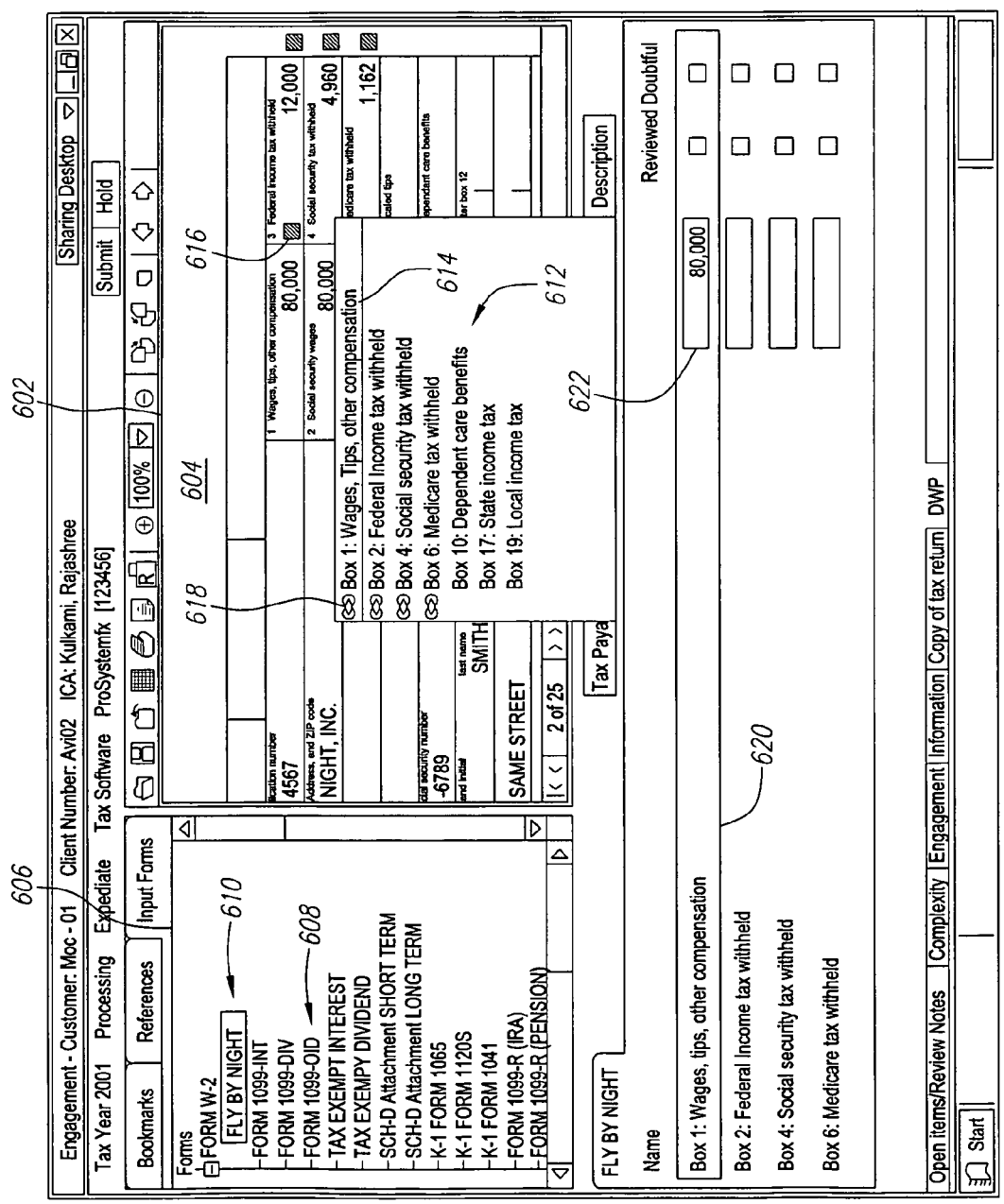
FIG. 6 is a graphical user interface (GUI) illustrating a view area for displaying a page of the electronic source document and a forms area for displaying a plurality of form types corresponding to a plurality of forms according to an embodiment of the invention.

FIG. 6 is a graphical user interface (GUI) 600 illustrating a document view area 602 for displaying a page 604 of the electronic source document and a forms view area 606 for displaying a plurality of form types 608 corresponding to a plurality of forms (S-504). The tax preparer views the page 604 of the electronic source document, and selects a form type 608 corresponding to the page 604 being displayed in the document view area 602 (S-506). Alternatively, the computer system 200A, using an optical character reader (OCR) system, can select the form type 608 by scanning the page 604. In the illustrated example, the form may be selected from the following: W-2, 1099-INT, 1099-DIV, 1099-OID, TAX EXEMPT INTEREST, TAX EXEMPT DIVIDEND, SCH-D Attachment SHORT TERM, SCH-D Attachment LONG TERM, K-1 FORM 1065, K-1 FORM 1120S, K-1 FORM 1041, FORM 1099-R (IRA), FORM 1099-R (PENSION), and so on.

Once the form type 608 has been selected, the tax preparer may input or if already input, may select a form name 610 identifying the page 604 being displayed in the document view area 602 (S-508). The form name 610 can be selected from a list of preexisting form names 610 or can be added by inputting a form name 610 representing the form name desired. For a W-2 form type, the form name is generally the employer's name, for a 1099 form type, the form name is generally the payer's name, and for a K-1 form type, the form name is generally the partnership's name. Alternatively, the computer system 100, using an optical character reader (OCR) system, can determine the form name 610 by scanning the page 604. In the illustrated example, the W-2 form type 608 and the FLY BY NIGHT form name 610 have been selected because the displayed page 604 is a FLY BY NIGHT W-2 document.

At S-509, the tax preparer determines whether a fully cross-referenced set of work papers is desired as the final work product (i.e., whether to place references on the page 604 of the electronic source document). If not, the tax preparer determines whether to send the tax document to a data entry operator for inputting of data values (S-520). If so, the tax preparer determines at S-510 whether to send the tax document (i.e., the page 604) to a referencer for referencing (S-512) or whether to keep the tax document for referencing (S-514). In one embodiment, the tax preparer may make this determination based on the form type 608. For example, if the form type 608 is a standard form (W-2, 1099, K-1, etc.), the tax document may be sent to the referencer. The tax preparer generally allows the service providers to access the standard forms because a lower level of skill is needed to input information related to these forms. If the form type 608 is a non-standard form (settlement statement, statement of business income/loss, etc.), the tax document may be kept for referencing. Standard forms are forms that contain the same set of data and non-standard forms are forms that do not contain the same set of data. For example, W-2 forms always have standard fields such as Box 1—Wages, tips, and other compensation, Box 2—Federal income tax withheld, etc. No such standard fields exist for a statement of business income/loss, as such, these forms would not be considered a standard form for these purposes.

S-512 and S-514 are optional steps of placing references on the page(s) of the electronic source document. For standard forms, the data entry operator or the referencer may place references 616 on the pages of the electronic source document (S-512). For non-standard forms, the tax preparer may place references 616 on the pages of the electronic source document (S-514). Once the location of the reference 616 is selected, a pop-up window appears with the same descriptions as those in the electronic source document. For example, the phrase "Box 1: Wages, Tips and Other Compensation" is on both the page 604 and in the pop-up window (see FIG. 6). Hence, the lower skilled data entry operator can easily select the correct field name 614 from a list of field names 612. Referencing is performed for the purpose of creating a fully cross-referenced set of work papers as a final work product. Further details regarding referencing and the cross-referenced set of work papers can be found in co-pending patent application Ser. No. 10/903,637, filed Jul. 30, 2004, which is hereby incorporated by reference.

For standard forms, the form type 608 and/or the form name 610 of the page to be referenced is placed in a referencing queue located in the memory 410. When a referencer is available to reference a page of the electronic source document, the available referencer request access to the next page of the electronic source document to be referenced by checking the referencing queue. The referencer may then access the page(s) of the electronic source document from the memory 410. FIG. 7 is a page 700 of the electronic source document, as seen by a referencer, illustrating a W-2 document from ABC INC. As shown in FIG. 7, the referencer does not have the ability to view all the form types 608 related to the tax return as shown in the forms view area 606 of FIG. 6.

Referencers may be assigned to one or more standard form types. For example, referencers may be assigned to a sub-set of standard forms which increases efficiency because the referencers only need to know the details about that specific group of standard forms. In one embodiment, each referencer may be assigned to only one standard form (e.g., W-2 forms). In this embodiment, each referencer only needs to know the details about one standard form, further increasing the efficiency of placing references on each page of the electronic source document. Alternatively, the tax preparer can act as the referencer and place the references on the page 604 of the electronic source document. After the referencing is complete, the referencer may select a submit icon 705 indicating to the tax preparer that the page of the electronic source document has been referenced.

FIG. 8 is a page 800 of the electronic source document, as seen by a tax preparer or a data entry operator, illustrating a W-2 document from ABC INC. At S-520, the tax preparer can decide whether to perform the data entry operations on the page 800 of the electronic source document (go to S-522) or submit the page 800 of the electronic source document to a data entry operator for performing the data entry operations (go to S-516). The tax preparer generally allows the service providers (e.g., a data entry operator) to access the page 800 of the electronic source document to input information related to these forms. In one embodiment, the form type 608 and/or the form name 610 of the page selected for data entry is placed in a data entry queue located in the memory 410. When a data entry operator is available to enter data for a page of the electronic source document, the available data entry operator request access to the next page for data entry by checking the data entry queue. The data entry operator may then access the page(s) 800 of the electronic source document from the memory 410.

The computer system 200 inserts, enables or displays the page of the electronic source document and an input form 805 having a plurality of input fields 810 corresponding to the form type 608 (S-516, S-522). That is, based on the form type 805, the plurality of input fields 810 are predetermined and are retrieved from the memory 410. The data entry operator or the tax preparer inputs the numbers shown on the page 800 into the corresponding input fields 810 on the input form 805 (S-518, S-524). The input fields 810 use the same descriptions as those in the electronic source document. For example, the phrase "Box 1: Wages, Tips and Other Compensation" is on both the page 800 and the input form 805. Hence, the lower skilled data entry operator can easily input the correct numbers from the page 800 into the corresponding input fields 810. Alternatively, the OCR system scans the page and inserts the appropriate number into the corresponding input field 810 on the input form 805. As shown in FIG. 8, the numbers input are 80000, 12000, 4960, and 1162. The references may also assist the OCR system in identifying the number corresponding to the input field 810. In one embodiment, one or more data entry operators and/or one or more OCR systems may input information for a particular page for verifying the accuracy of the inputted numbers. The data entry operator and/or the OCR system can move from one page of the electronic source document to another page of the electronic source document or from one electronic source document to another electronic source document. After data entry is complete and/or verified, the data entry operator may select a submit icon 815 indicating to the tax preparer that the page of the electronic source document has been completed. The inputted information is then merged into the tax return.

Figure 9:
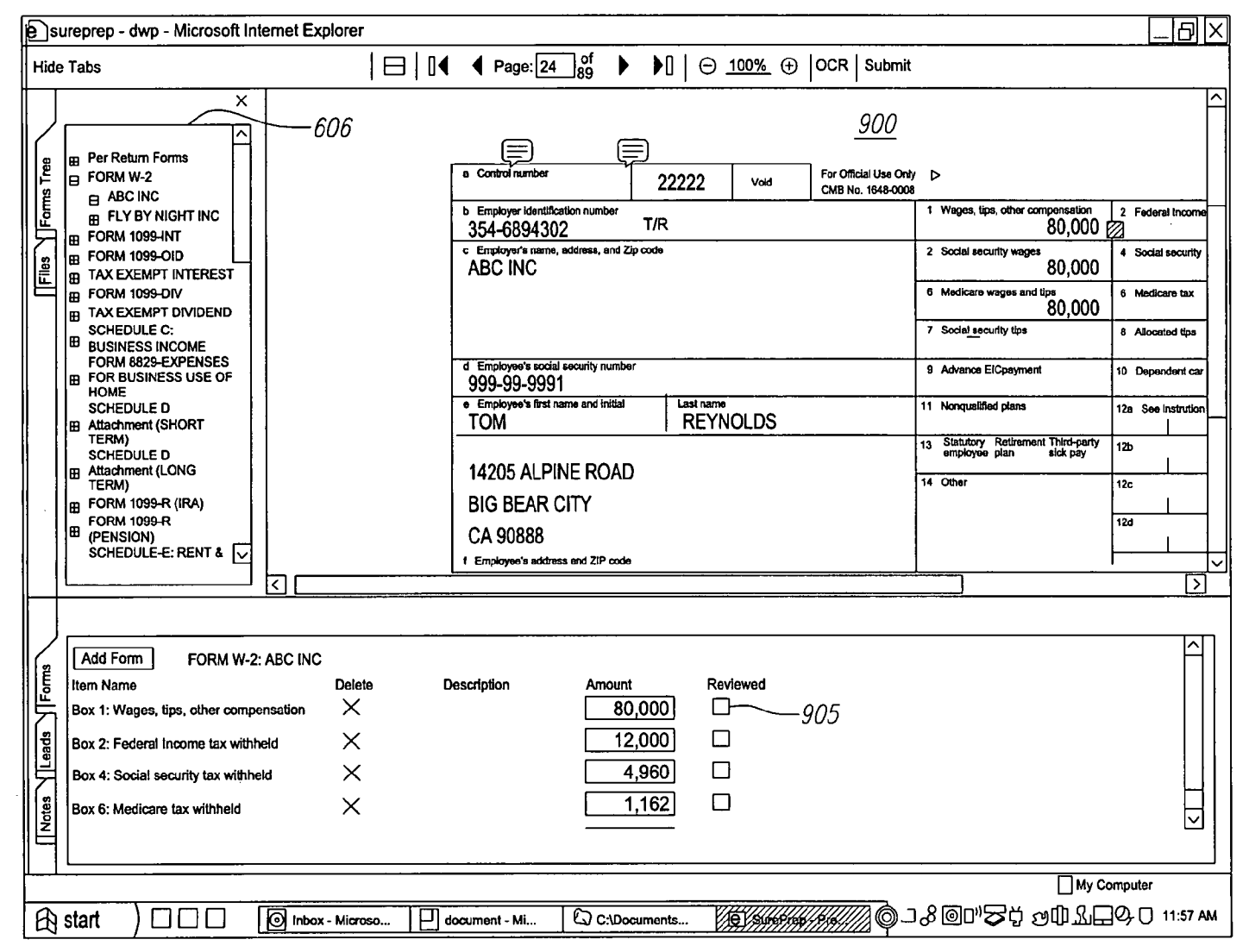

FIG. 9 is a page of the electronic source document, as seen by a tax preparer, illustrating a W-2 source document from ABC INC. The tax preparer can now review the information for accuracy and completeness and check a box 905 indicating that the entry or number has been reviewed (S-526). As shown in FIG. 9, the tax preparer has the ability to view all the form types 608 related to the tax return as shown in the forms view area 606. Each data value input into the input fields 810 is mapped into a corresponding field of a tax return. The mapping allows for the creation of a completed tax return. The mapping of the data depends on the tax software used to create the completed tax return. For example, some tax software has built-in import/export features to allow for the mapping of data from one application to another.

Although exemplary embodiments of the invention has been shown and described, many other changes, combinations, omissions, modifications and substitutions, in addition to those set forth in the above paragraphs, may be made by one having skill in the art without necessarily departing from the spirit and scope of this invention. Accordingly, the invention is not intended to be limited by the preferred embodiments, but is to be defined by reference to the appended claims.

What is claimed is:

1. A processor-based method for preparing a tax return comprising:
   receiving, at a first computer operated by a tax provider, an image file that includes a plurality of data values;
   associating, at the first computer, the image file with an electronic tax return document having a first tax form and a second tax form;
   submitting, at the first computer, the image file and the first and second tax forms to an electronic queue;
   retrieving, at a second computer operated by a referencer, the image file from the electronic queue;
   placing a reference adjacent to at least one of the plurality of data values of the image file using the second computer;
   submitting the referenced image file to the electronic queue;
   retrieving, at a third computer operated by a first service provider, the referenced image file and the first tax form from the electronic queue;
   retrieving, at a fourth computer operated by a second service provider, the referenced image file and the second tax form from the electronic queue;
   populating the first tax form with the at least one of the plurality of data values of the referenced image file associated with the reference using the third computer;
   populating the second tax form with the at least one of the plurality of data values of the referenced image file associated with the reference using the fourth computer;
   allowing the first service provider operating the third computer to populate the first tax form with data values from the image file and the second service provider operating the fourth computer to populate the second tax form with data values from the image file simultaneously; and
   preparing, at the first computer, a single tax return by merging the populated first and second tax forms.

2. The method of claim 1 further comprising sending a request to access the electronic queue from the third computer to the first computer prior to retrieving, at the third computer, the image file and the first tax form from the electronic queue.

3. The method of claim 1 wherein the third computer is configured to populate only a specific type of tax form.

4. The method of claim 1 further comprising storing, by the third computer, the populated first tax form in a memory located remotely from the third computer.

5. The method of claim 1 wherein the first and second tax forms are each selected from a group consisting of a W-2 form, a 1065 form, a 1098 form, a 1099 form, a K-1 form, a schedule C form, a schedule D form, a deductions form, a credit form, and a taxes paid/received form.

6. A processor-based method for preparing a tax return using multiple service providers comprising:
   receiving, at a first computer operated by a tax provider, an image file that includes a plurality of data values;
   associating, at the first computer, the image file with an electronic tax return document having a first tax form and a second tax form;
   assigning, at the first computer, the image file and the first tax form to a first service provider, the first service provider configured to only populate the first tax form;
   assigning, at the first computer, the image file and the second tax form to a second service provider, the second service provider configured to only populate the second tax form;
   submitting the first tax form and the second tax form to an electronic queue;
   retrieving, at a second computer operated by a referencer, the image file from the electronic queue;
   placing a reference adjacent to at least one of the plurality of data values of the image file using the second computer;
   submitting the referenced image file to the electronic queue;
   retrieving, by a third computer operated by the first service provider, the first tax form from the electronic queue;
   retrieving, by a fourth computer operated by the second service provider, the second tax form from the electronic queue;
   populating the first tax form with the at least one of the plurality of data values of the referenced image file associated with the reference using the third computer;
   populating the second tax form with the at least one of the plurality of data values of the referenced image file associated with the reference using the fourth computer;
   allowing the first service provider operating the third computer to populate the first tax form with data values from the image file and the second service provider operating the fourth computer to populate the second tax form with data values from the image file simultaneously; and
   preparing, at the first computer, a single tax return by merging the populated first and second tax forms.

7. The method of claim 6 wherein the first service provider is configured to populate a different type of tax form than the second service provider.

8. The method of claim 6 further comprising accessing, at the first computer, the populated first tax form and the populated second tax form.

9. The method of claim 6 further comprising storing the populated first tax form and the populated second tax form in a memory located remotely from the first service provider and the second service provider.

10. The method of claim 6 further comprising notifying the first computer that the first tax form and the second tax form have been populated with data values.

11. The method of claim 6 wherein the first tax form and the second tax form are each selected from a group consisting of a W-2 form, a 1065 form, a 1098 form, a 1099 form, a K-1 form, a schedule C form, a schedule D form, a deductions form, a credit form, and a taxes paid/received form.

* * * * *